(No Model.)  2 Sheets—Sheet 1.

W. H. STEVENS.
WHEEL FELLY MACHINE.

No. 317,876. Patented May 12, 1885.

Witnesses:
Morris G. Clarke
Edwin R. Clarke

Inventor:
Wm Henry Stevens

N. PETERS, Photo-Lithographer, Washington, D. C.

(No Model.) 2 Sheets—Sheet 2.

W. H. STEVENS.
WHEEL FELLY MACHINE.

No. 317,876. Patented May 12, 1885.

Witnesses:
Morris G. Clarke
Edwin R. Clarke

Inventor:
Wm Harry Stevens

UNITED STATES PATENT OFFICE.

WILLIAM H. STEVENS, OF COLDWATER, MICHIGAN.

WHEEL-FELLY MACHINE.

SPECIFICATION forming part of Letters Patent No. 317,876, dated May 12, 1885.

Application filed July 18, 1884. (No model.)

*To all whom it may concern:*

Be it known that I, WILLIAM H. STEVENS, a citizen of the United States, residing at Coldwater, in the county of Branch and State of Michigan, have invented certain new and useful Improvements in Machines for Sawing Off and Boring Wheel-Fellies, of which the following is a description.

This invention relates to that class of machines which are used for sawing off the ends of wheel-fellies, boring the ends to receive dowels, and boring the inner arc to receive spoke-tenons; and it consists in means for sawing off both ends of a felly at once, and means for boring all the holes required in the same felly at one action and without removing it from the gage whereon it was sawed.

To this end my invention consists in the construction and combination of parts forming a machine for sawing and boring fellies, hereinafter described and claimed, reference being had to the accompanying drawings, in which—

Figure 1:
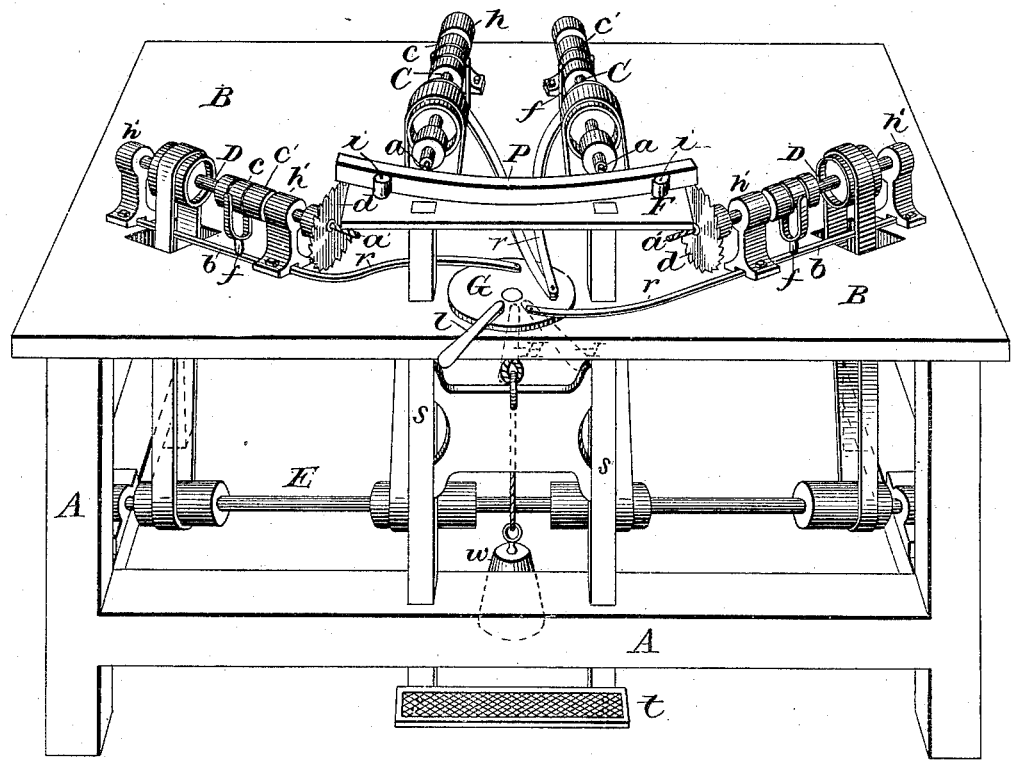
Figure 2:
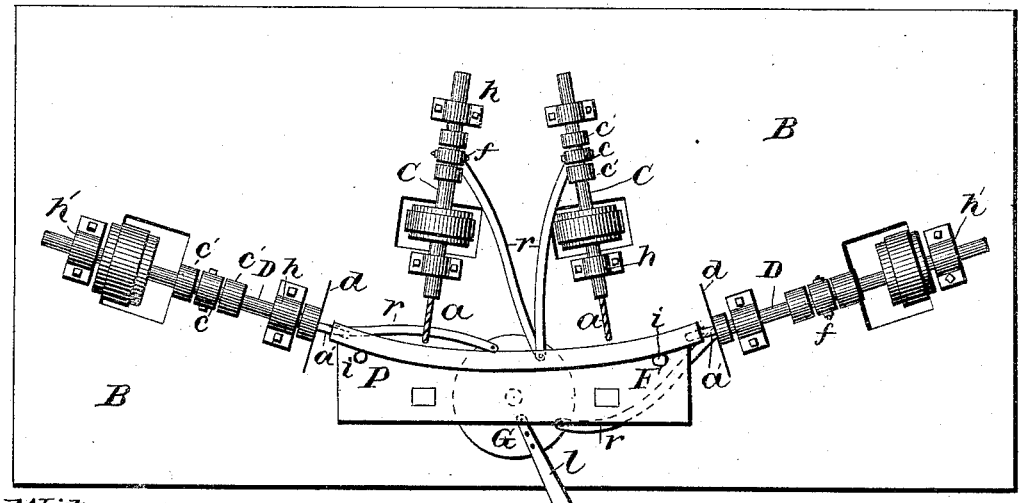
Figure 3:
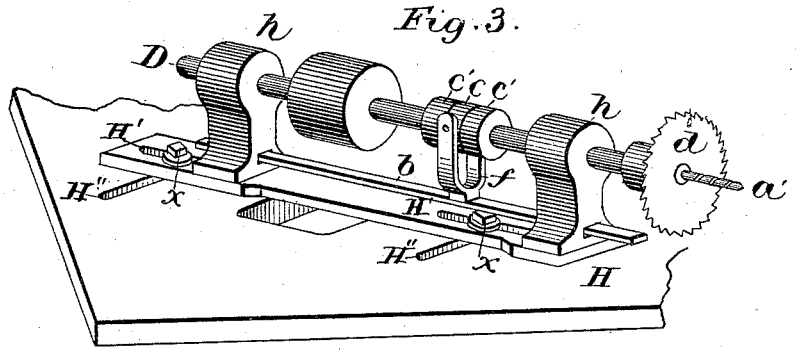
Figure 5:
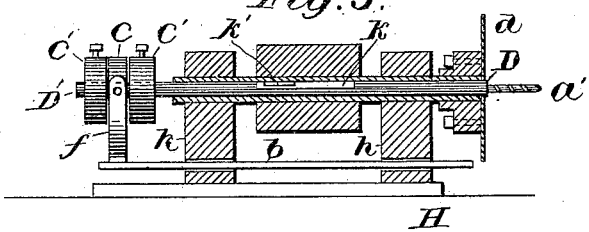
Figure 4:
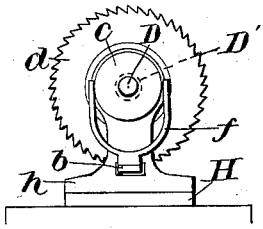

Figure 1 is a perspective view of my invention, showing all but the bases of the bearing-standards. Fig. 2 is a plan view of the same. Fig. 3 is a perspective view of a portion of the machine, showing one of the bases omitted in Fig. 1. Fig. 4 is a rear end view of a modification of part of the machine, and Fig. 5 is a longitudinal section, part in elevation, of the said modification.

A represents the frame of the machine, and B the table thereof.

C C are shafts journaled in bearings $h$, to revolve and to reciprocate longitudinally therein. These shafts carry each a boring-bit, $a$, to bore the holes in the felly P to receive the tenons of the outer ends of spokes.

D D are shafts mounted in bearings $h'$, to revolve and to reciprocate longitudinally therein. In the adjacent ends of these shafts are bits $a'$ to bore holes in both ends of a felly, P, at the same time. On the same end of each shaft D is a circular saw, $d$, to saw off the ends of the felly previous to boring it.

F is a table provided with the usual studs, $i$, as a gage, against which to hold the felly P while it is being worked upon. This table is provided with uprights S, to slide vertically through the table B, and with a treadle, $t$, to lower the felly upon the edges of the saws $d$ in sawing it off and to bring it down to adjustable gages, (not shown,) holding the felly at the proper height to be centrally bored. $w$ is a weight provided with a cord running over a pulley and attached to the cross-bar between the uprights $s$, to elevate the table F when the foot-pressure is removed. Each of the shafts C C and D D is provided with two fixed collars, $c'$ $c'$, between which is a loose collar, $c$, engaged by a shifter, $f$, attached to a slide-rod, $b$, provided with a connecting-rod, $r$.

G is a centrally-pivoted disk provided with a hand-lever, $l$. Each of the rods $r$ is pivoted to the disk G at some distance from the center thereof, and at points where the said rods are somewhat tangent thereto, so that by swinging the lever $l$ in one direction all the boring-bits $a$ $a$ and $a'$ $a'$ will be advanced into the felly, while by moving the lever $l$ in the opposite direction all the bits will be retracted at once. By a similar movement the shafts D may be set in a position to saw the felly as required.

For making a great many fellies of one size the bearing-standards $h$ of the shafts C may be so fixed to the table as to set the said shafts exactly radial to the felly, and the shafts D may be similarly set tangent to the arc of the felly at its ends, so as to saw the ends of the felly in radial planes, and so as to bore the said ends at right angles to the said planes, whereby straight dowels will enter the holes so bored and will join two such fellies; but in the general run of work the sizes of wheel-fellies vary, so that to accomplish the results just stated a certain amount of adjustment is required for all the bearing-standards $h$.

To maintain the proper relation of each two standards, I fix them in pairs upon base-pieces H. (See Fig. 3.) Each base-piece is perforated with two vertical longitudinal slots, H', and the table B is perforated with two vertical slots, H'', to cross the same nearly at right angles. Through a slot in the base-piece and a slot in the table a bolt, $x$, passes to secure the base-piece upon the table at the required angle. By this means the shafts C may be set the right distance apart to properly space the spokes of any wheel and yet be set radial to the felly of that wheel. By the same means the shafts D may be set tangent to a felly of any size. Of course one of the shafts C may be omitted and the other set on a central radius to the felly, in case but one spoke is to be placed in a felly. This machine is particularly designed for use in making such wheels as are composed of sawed fellies, of which four or more are generally required to complete the rim; but it may be adapted to fitting the rims of wheels which are bent in halves. For this purpose the shafts D would be placed parallel with each other and made adjustable to and from each other to fit wheels of different diameters, and any suitable number of shafts C would be fitted upon the table B, as described. I have shown all the shafts C and D provided with pulleys, and belts running from one counter-shaft, E, journaled in the frame A; but any other arrangement common to the art may be made for this purpose. It is evident that the radial shafts C would be serviceable without combination with the shafts D, and vice versa; but I prefer the whole combination as shown, as producing the best results. In the modification shown in Fig. 5 the saw-arbor is journaled in the posts $h$, which posts being fixed to the base H may be set for the saw to cut any number of fellies of one length, and then the base H may be moved to set the saws for another length; but the saw-arbor is hollow, and the boring-shaft D' is fitted to revolve with it by means of a spline and slot, $k'$, and to slide longitudinally through it to actuate the boring-bit to and fro by the clutch and slide-bar connections before described.

What I claim as my invention, and desire to secure by Letters Patent, is—

1. The combination, with two shafts journaled in the same horizontal plane and tangent at their adjacent ends to the arc of a horizontal circle in said plane at the ends of said arc, of another shaft journaled in the same plane on a radius of the said arc, all of the said shafts being provided with boring-bits and means for reciprocating them longitudinally, as and for the purpose specified.

2. The combination, with two shafts journaled in the same horizontal plane, tangent at their adjacent ends to the arc of a circle in said plane at the ends of the said arc, and provided with circular saws on the said adjacent ends, of a table located centrally between the said adjacent ends and provided with vertical sliding guides, and guides for fixing a felly on the said table in a tangent position to the said shafts, as shown and described, whereby the felly so fixed may be carried down upon the saws to saw off both ends of the felly at once radially to its arc.

3. The combination, with two shafts, D, provided with saws on their adjacent ends and boring-bits in the same ends, of a table, F, provided with vertical guideways $s$, means for vertically reciprocating and setting the table, and means for rotating the boring-bits and reciprocating them longitudinally, substantially as shown and described.

4. The combination, with a series of shafts, C and D, journaled in the same plane in bearings $h\ h'$, respectively, and provided with boring-bits $a'$, of the shifters $f$, located on said shafts, the slide-bars $b$, the pivoted disk G, and the connecting-rods $r$, substantially as shown and described.

WM. H. STEVENS.

Witnesses:
WM. FARGHER,
ORAL CRAMTON.